United States Patent Office 3,359,293
Patented Dec. 19, 1967

3,359,293
MONO-ORTHO,ORTHO'-BIPHENYLENE SUBSTITUTED ARYLCYCLOSILOXANES
Tse C. Wu, Waterford, N.Y., assignor to General Electric Company, a corporation of New York
No Drawing. Filed Feb. 17, 1965, Ser. No. 433,482
5 Claims. (Cl. 260—448.2)

This invention relates to cyclopolysiloxanes. More particularly, this invention relates to cyclopolysiloxanes substituted with the thermally stable ortho,ortho'-biphenylene group, and having the structure:

(1)

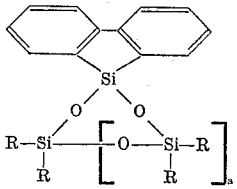

where R is a monovalent aryl radical and $a$ is an integral number of from 1 to 2, inclusive.

Among the aryl groups which R can represent are phenyl, ortho-tolyl, meta-tolyl, para-tolyl, ortho-trifluoromethylphenyl, meta-trifluoromethylphenyl, para-trifluoromethylphenyl, cyanophenyl, benzoylphenyl, para-phenoxyphenyl, xylyl, ethylphenyl, naphthyl, biphenylyl, etc.

The compounds of the present invention are formed by the reaction of 5,5-dichlorodibenzosilole with an organopolysiloxanediol in the presence of a solvent and an acid acceptor according to the reaction:

(2)

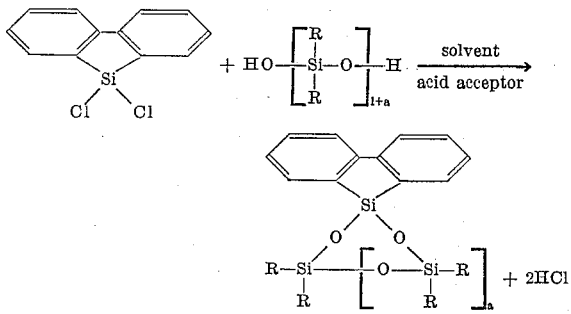

where R and $a$ are as previously defined.

The solvents which can be utilized for the reaction comprise essentially any organic material which is inert to the reactants under the conditions of reaction. However, the preferred solvents are the hydrocarbons, such as benzene, toluene, xylene, pentane, hexane, heptane, etc. Polar solvents such as ethers and ketones are usable, but are not preferred. The polar solvents tend to keep the acid acceptor-hydrogen chloride salts formed in the reaction in solution. Any of the utilizable solvents can be mixed, that is, one solvent can be used for one of the reactants, and a different solvent for the other reactant.

Preferably, the two reactants are added to a reaction vessel simultaneously, each being contained in a solvent medium. However, if desired, the chlorosilane can be added to a solvent solution of the polysiloxanediol. Since a cyclic polysiloxane is to be formed, the conditions of reaction should favor the formation of such a compound. In general, the more dilute the solution, the more the formation of a cyclic is favored. Thus, the final concentration should be no more than about 2 moles of total reactant per liter of solvent, and preferably no more than about 0.5 mole of total reactant per liter of solvent.

The product of the present invention can be formed with the two reactants shown in Equation 2 in a stoichiometric ratio of 1:1, or a 50% excess, based on the stoichiometric ratio, of either of the reactants can be used.

Among the acid acceptors which can be utilized are the tertiary amines, including pyridine, picoline, 1,4-diazobicyclo(2,2,2)octane and the dialkylanilines. These acid acceptors absorb generated hydrogen chloride in a molar ratio of 1:1. Since one mole of hydrogen chloride is generated for each mole of reactant, there must be at least one mole of acid acceptor for each mole of reactant. Preferably, the acid acceptor is present in an amount at least 50% in excess of the stoichiometric requirement and can be present in an excess of several hundred percent.

The reaction can be conducted at any temperature from about 10° C. to the boiling point of the reaction mixture. Preferably, the reaction is conducted at room temperature both for convenience and because the reaction is accomplished rapidly, even at this temperature.

The reactants should be added over a period of from about 30 minutes to about 2 hours, to aid in assuring the formation of cyclics. The relatively slow addition rate prevents the concentration of reactants from rising beyond a desirable level and thus maintains the dilute solution which promotes the formation of cyclics. Preferably, the reaction mixture is stirred for at least one hour following the addition to assure completion of the reaction.

Following completion of the addition and the subsequent stirring, the reaction mixture is filtered to remove the acid acceptor-hydrogen chloride salts. The solvent is then evaporated and the resultant compound is further purified by recrystallization from hydrocarbon solvents, such as pentane, petroleum ether, hexane, and cyclohexane.

The formation of the cyclopolysiloxane of the present invention will now be described in greater detail. These examples should be considered as illustrative only, and not as limiting in any way, the full scope of the invention as covered in the appended claims.

The 5,5-dichlorodibenzosilole is prepared by the reaction of 2,2'-dibromobiphenyl with butyl lithium to form 2,2'-dilithiobiphenyl which is subsequently reacted with silicon tetrachloride to form the 5,5-dichlorodibenzosilole and, as a by-product, 5,5-spirobi(dibenzosilole), according to the following reactions:

(3)

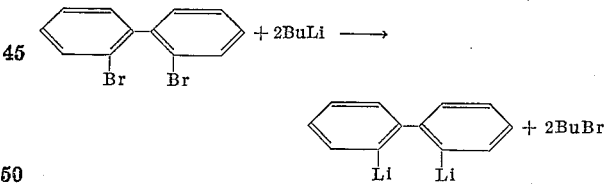

(4)

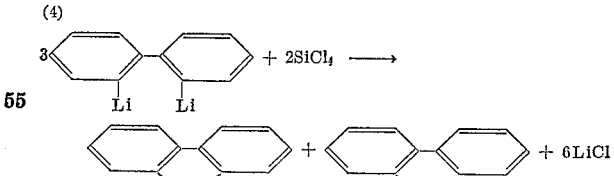

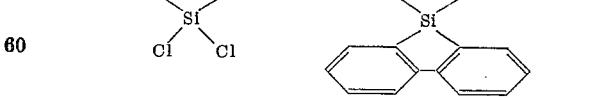

where Bu is the butyl group. The reactions will now be described in greater detail. All parts are by weight. A solution containing 20 parts of the 2,2'-dibromobiphenyl compound in 65 parts of benzene was placed into a reaction vessel. Slowly, a quantity of 80 parts of a 1.6 molar butyl lithium in hexane solution was added to the reaction vessel. The reaction mixture was allowed to stand overnight, was diluted with 160 parts of benzene, and was then added, with stirring, to a reaction vessel containing 37 parts of silicon tetrachloride in 45 parts of benzene, over a period of 40 minutes, at reflux. The resulting mixture was heated for an additional 2 hours at reflux and then allowed to cool to room temperature. This mixture was then filtered, the filtrate distilled to remove most of the solvent, and the residue subjected to a micro-distillation resulting in 9 parts (56% based on the theoretical) of 5,5-dichlorodibenzosilole boiling at 119° C. at 0.1 mm. The structure of the material was substantiated by an infrared spectrum. The material had a melting point of 98°–100° C. Additionally, 4.5 parts (42% based on the theoretical) of the bicyclic compound was obtained.

In some of the following examples, tolyl-substituted polysiloxanediols are utilized. The preparation of these materials will be illustrated by the preparation of sym-tetra-m-tolyldisiloxanediol. All parts in this illustration are by weight. A solution containing 500 parts of ether, 120 parts of sodium bicarbonate, and a small quantity of water were placed in a reaction vessel. To the vessel was added a second solution containing 126.8 parts of sym-dichlorotetra-m-tolyldisiloxane in 250 parts of ether, over a period of 1.5 hours. The resulting slurry was stirred at room temperature for 18 hours, filtered, and the filtrate placed in a flash evaporator to remove the solvent. A 95% yield of crude product melting at 60°–68° C. was obtained. The crude product was recrystallized twice from petroleum ether and gave a material having the formula:

(5)

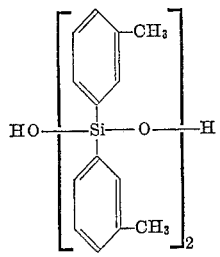

which had a melting point of 68.5°–69.5° C. By a similar procedure, hexa-p-tolyltrisiloxane-1,5-diol was prepared; it had a melting point of 139°–141° C. The structure of each of these tolyl-substituted polysiloxane diols was substantiated by infrared analysis.

*Example 1*

All parts in this example are by weight. Into a reaction vessel were placed 5 parts of pyridine and 88 parts of benzene. Two solutions were prepared, the first containing 5 parts of 5,5-dichlorodibenzosilole in 53 parts of benzene and the second containing 8.3 parts of sym-tetraphenyldisiloxanediol in 53 parts of benzene. The two solutions were added simultaneously, at about the same rate, to the reaction vessel over a period of 30 minutes at room temperature. Some heat was generated and a large amount of white precipitate formed. The mixture was stirred for an additional 2 hours at room temperature and was then filtered, using suction. The resulting filtrate was distilled to yield a solid residue which melted at about 230° C. This residue was recrystallized twice from toluene to give a white powder melting at 248°–250° C. and having the structure:

(6)

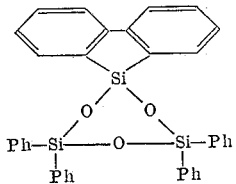

where Ph is the phenyl group. This structure was substantiated by an infrared spectrum.

*Example 2*

Into a reaction vessel are placed 80 ml. of pyridine and 250 ml. of diethyl ether. Two 250 ml. solutions are prepared, the first containing 122.4 g. of hexaphenyltrisiloxane-1,5-diol in diethyl ether and the second containing 75.3 g. of 5,5-dichlorodibenzosilole in benzene. The two solutions are added simultaneously at the same rate to the reaction vessel over a period of about 1 hour at room temperature. The mixture is stirred for an additional 1.5 hours and is then filtered to remove the pyridine hydrochloride salt. The filtrate is distilled to remove the solvent and the residue is recrystallized from cyclohexane to yield the product having the formula:

(7)

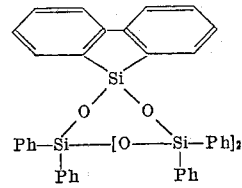

where Ph is the phenyl group.

*Example 3*

Into a reaction vessel are placed 73.5 ml. of 2-picoline and 125 ml. of toluene. Two 125 ml. solutions are prepared, the first containing 70.5 g. of sym-tetra-m-tolyldisiloxanediol in toluene and the second containing 25.1 g. of 5,5-dichlorodibenzosilole in toluene. The two solutions are added to the reaction vessel at about the same rate with stirring, at room temperature over a period of about 90 minutes. The mixture is stirred for an additional two hours and is then filtered to remove the picoline hydrochloride salts. The filtrate is distilled to remove the solvent and the residue is recrystallized from benzene to yield the product having the formula:

(8)

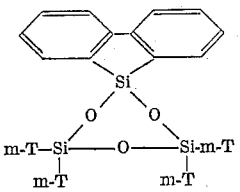

where m-T is the meta-tolyl group.

*Example 4*

Into a reaction vessel are placed 96 ml. of diethylaniline and 200 ml. of benzene. Two 200 ml. solutions are prepared, the first containing 69.6 g. of hexa-p-tolyltrisiloxane-1,5-diol in benzene and the second containing 25.1 g. of 5,5-dichlorodibenzosilole in benzene. The two solutions are added simultaneously at about the same rate to the aniline-benzene mixture, with stirring, at room temperature over a period of about 2 hours. The resulting mixture is stirred for an additional hour at room temperature and is then filtered to remove the aniline hydrochloride salts. The filtrate is distilled to remove the solvent and the resulting residue is recrystallized from xylene to yield the product having the formula:

(9)

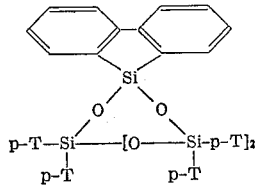

where p-T is the para-tolyl group.

The cyclopolysiloxanes just described are characterized by exceptional thermal stability. For example, the cyclopolysiloxane of Example 1 was heated, at the melt, at 260°–265° C. in the presence of potassium hydroxide and resulted in little, if any, polymerization. Thus, these materials are valuable as grease additives, for greases such as silicones, which are to be subjected to high temperatures. For example, the cyclopolysiloxanes formed according to the present invention can be blended in an amount of from about 0.1 to 10 percent, by weight, with a chlorophenylmethylpolysiloxane fluid to yield an extremely high temperature resistant grease formulation.

Due to this demonstrated high temperature stability, these compounds are additionally valuable as high temperature heat transfer fluids.

What I claim as new and desire to secure by Letters Patent of the United States is:

1. A cyclopolysiloxane having the structure:

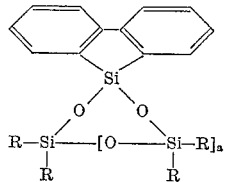

where R is a monovalent aryl radical and $a$ is an integral number of from 1 to 2, inclusive.

2. A cyclopolysiloxane having the structure:

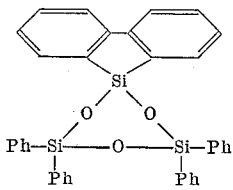

where Ph is the phenyl group.

3. The cyclopolysiloxane:

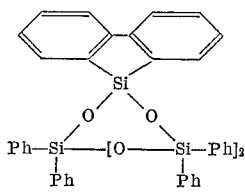

where Ph is the phenyl group.

4. The cyclopolysiloxane:

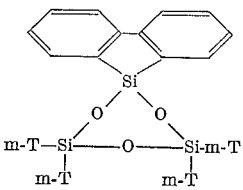

where m-T is the meta-tolyl group.

5. The cyclopolysiloxane:

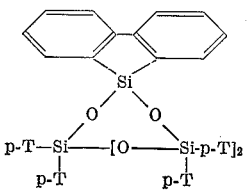

where p-T is the para-tolyl group.

References Cited

UNITED STATES PATENTS 3,318,935   5/1967   Sporck _____ 260—448.2

FOREIGN PATENTS 1,118,776   6/1956   France.

TOBIAS E. LEVOW, *Primary Examiner.*

P. F. SHAVER, *Assistant Examiner.*